Figure 3:
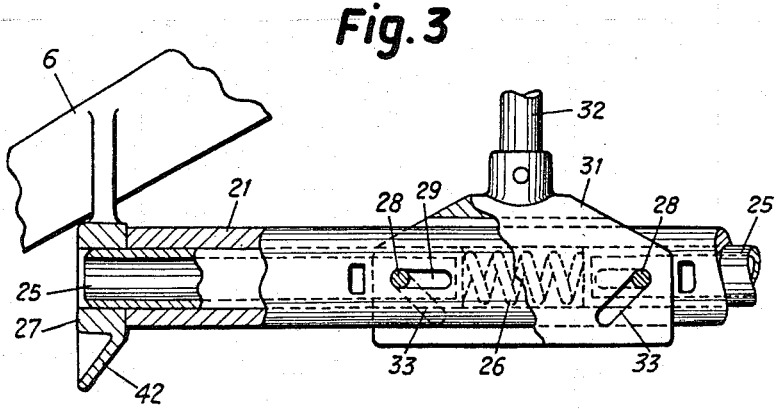

Sept. 22, 1959  H. HERLACH  2,905,057
GUN CARRIAGE
Filed July 26, 1954  2 Sheets-Sheet 1
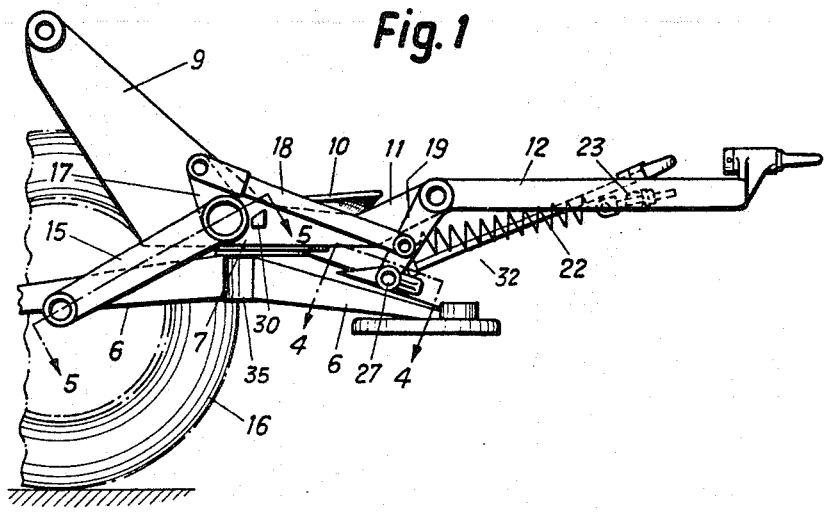
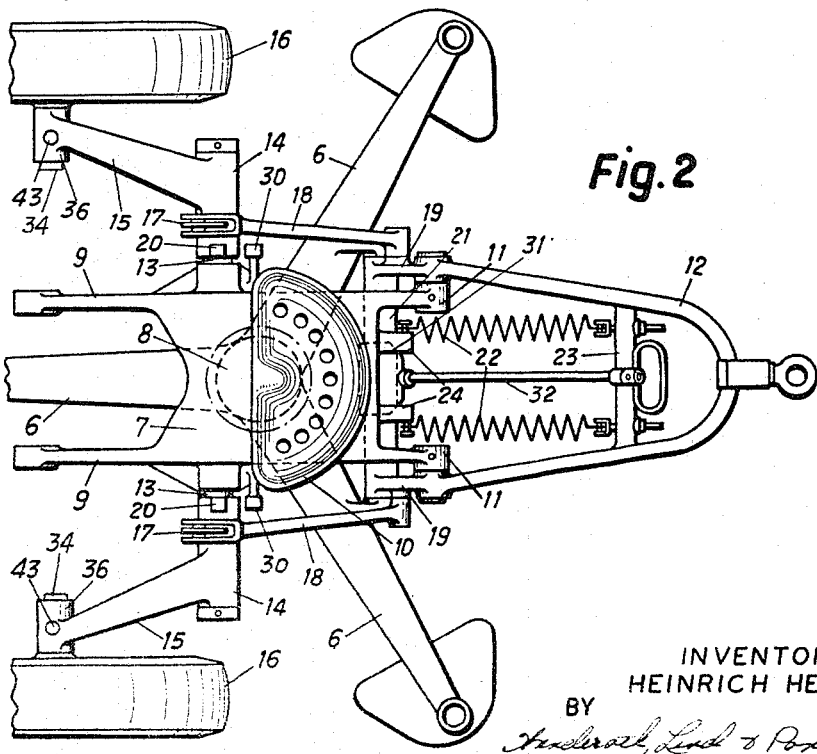
INVENTOR
HEINRICH HERLACH
BY Sept. 22, 1959  H. HERLACH  2,905,057
GUN CARRIAGE
Filed July 26, 1954  2 Sheets-Sheet 2

INVENTOR
HEINRICH HERLACH

United States Patent Office 2,905,057
Patented Sept. 22, 1959

2,905,057

GUN CARRIAGE

Heinrich Herlach, Zurich, Switzerland, assignor to Machine Tool Works Oerlikon, Administration Company, Zurich-Oerlikon, Switzerland, a Swiss company Application July 26, 1954, Serial No. 445,737

Claims priority, application Switzerland July 28, 1953

2 Claims. (Cl. 89—40)

The present invention relates to wheeled gun carriages of the type in which a set of wheels is adapted to be raised from a driving position, in which it supports the weight of the gun carriage, into an alert position, in which it is relieved from such weight, while loading a spring, the potential energy stored in said spring being then available for facilitating the raising of the gun carriage relative to the said set of wheels when restoring the same from the alert position to the driving position.

The invention has the main object of providing a gun carriage of this type in which the set of wheels can be raised completely off the ground so that the portion of the gun carriage on which they are mounted can be turned a full circle, without requiring an additional effort from the operator beyond that required for relieving the said wheels from the weight of the gun carriage.

It is another object of the invention to provide a gun carriage of the type referred to wherein any danger to the operator arising from releasing the potential energy stored upon raising the said set of wheels from the driving position to the alert position when returning the same from the alert position to the driving position, is obviated.

It is yet another object of the invention to provide a gun carriage of the type referred to having detachable wheels wherein the gun carriage is automatically locked in the alert position as long as the wheels are detached therefrom, and can only be lowered into the driving position, when the said wheels are fitted.

With these and other objects in view I provide a gun carriage comprising in combination: a carriage body, a set of wheels moveably connected to the said carriage body and having a lower driving position, in which they support the weight of the said gun carriage, and a raised alert position, in which they are relieved from said weight, and a power accumulator operatively connected to both the said carriage body and the said set of wheels in the sense of being loaded when raising the said set of wheels from the driving position up to a maximum loading attained before reaching the said alert position, and of being partly unloaded when completing the raising of the said set of wheels right to the alert position.

Preferably the said gun carriage comprises a ground support member, the said power accumulator attaining its maximum loading substantially when the supporting faces of the said ground support member and the lowest point of the said wheels are on equal level.

In a preferred embodiment the said gun carriage comprises in combination: a carriage body, a wheel carrier tiltably connected to the said carriage body, a set of wheels journalled on the said wheel carrier, a rocker arm fixedly connected to the said wheel carrier, and a power accumulator operatively connected to both the said carriage body and the said rocker arm, in the sense of being loaded when raising the said wheel carrier from a driving position, in which the said wheels support the weight of the said gun carriage, towards an alert position, in which the same are released of said weight, the connecting point of the said power accumulator to the said rocker arm passing a dead center position in respect of the loading of the said power accumulator shortly before reaching the said alert position.

In a development of the said embodiment, wherein the said wheels are detachable from the said wheel carrier, locking means controlled by the said wheels and operatively engaging the said wheel carrier are provided, which lock the said wheel carrier in the alert position when the said wheels are detached.

Figure 4:
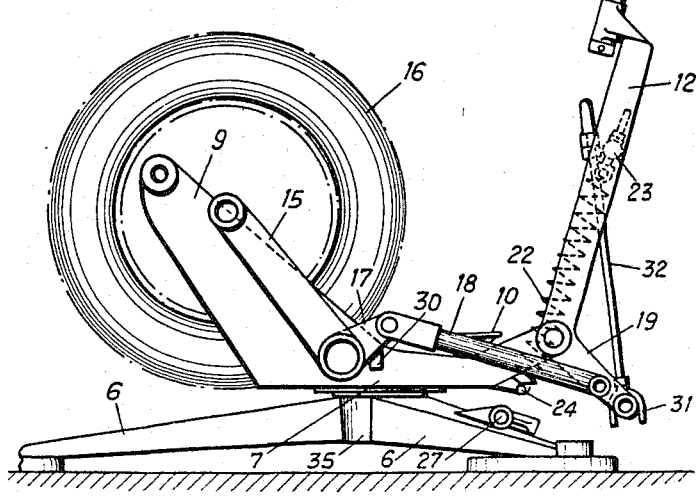
Figure 5:
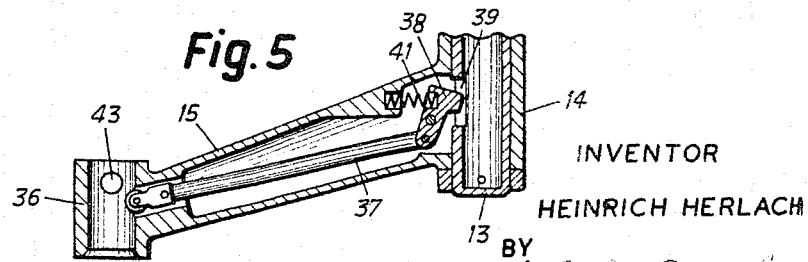

These and other objects and features of my invention will be clearly understood from the following description of a preferred embodiment thereof given by way of example with reference to the accompanying drawings, in which:

Fig. 1 is a lateral elevation, partly broken off, of a gun carriage according to the invention in the driving position, Fig. 2 is a plan view in the gun carriage in the position according to Fig. 1, Fig. 3 is a section partly along the line 4—4 of Fig. 1 and partly broken off, on an enlarged scale, Fig. 4 is a lateral elevation of the gun carriage in the firing position, and Fig. 5 is a section along the line 5—5 of Fig. 1 on an enlarged scale.

On the tripod 35 having three ground supports 6 the upper gun carriage portion 7 is rotatably mounted on the pivot pin 8. Two webs 9 provided at one end of the upper gun carriage portion form the trunnion hole, while on two extensions 11 arranged at the opposite end of the upper gun carriage portion the fork-shaped pole 12 is mounted pivotally. The upper gun carriage portion is moreover provided with two pivots 13 lying in alignment with one another, on which bushes 14 are mounted rotatably. It carries moreover a seat 10 for the gunner, and the weapon (not shown) which is mounted in the trunnion hole. On the bushes 14, on the one hand the carrier arms 15 for the wheels 16, and on the other hand the levers 17 are attached. Moreover on the inner end of each of the bushes an abutment 20 is provided, which cooperates with a counter-abutment 30 on the upper gun carriage portion. On the ends of each of the levers 17 a rod 18, forked at one end, is engaged, the other end of which is articulated on an arm of the pole 12. The ends of the two arms 19 are connected with one another by means of a tubular piece 21. Two coiled springs 22 engage at one end on a transverse bar 23 attached to the pole 12 and at the other end on blocks 24 arranged on the upper gun carriage portion 7 between the extensions 11.

For the purpose of locking the pole 12 in the position as illustrated in Figs. 1 and 2, two bolts 25 are slidably arranged in the tube 21 which are pushed apart by the coiled spring 26 and towards the eyes 27 provided on the two ground supports 6 pointing towards the side of the gun, as will be clear in detail from Fig. 3. Through each of the bolts 25 a pin 28 is pushed which extends through two opposite slots 29 in the tube 21 running parallel to the axis thereof. Over the middle of the tube a fork-shaped component 31 is pushed, which is engaged by a rod 32 having an operating handle and slidably guided on the transverse bar 23. In this part two pairs of slots 33 are provided which run obliquely to the axis of the rod 32, and which are likewise engaged by the pins 28. When this handle is pulled, the pins 28 displace themselves in the slots 29 and 33 against the action of the spring 26, and carry along the bolts 25 until the same come out of engagement with the eyes 27.

For the purpose of transition of the gun carriage from the driving position to the firing position the pole 12 is tilted together with the upper gun carriage portion about the pivots of the wheels 16 until the two ground supports pointing sideways contact the soil. Then the handle on the rod 32 is operated and thereafter the pole 12 is tilted up. By way of linking means formed by the rods 18, the levers 17 and the bushes 14 the carrier arms 15 are turned in the clockwise direction, until all three ground supports 6 and the wheels 16 rest on the soil. The loading of the springs 22 which is thereby effected resists this movement so that the person performing the tilting of the pole need not apply a great force in order to prevent to rapid a lowering of the tripod together with the upper gun carriage portion and the gun barrel. The pole then assumes a position in which the centre lines of the springs 22 run at the right hand side from the articulation point of the pole, but not far remote therefrom. Upon continued tilting of the pole 12 by the operator, the position illustrated in Fig. 4 is finally reached, in which the centre lines of the springs 22 have crossed the articulation point of the pole, and now tend to tilt the pole further in the anti-clockwise direction. The operator must apply a certain force for this purpose, since the springs 22 are to be further loaded, until they reach a maximum tension at the moment when their centre lines cross the articulation point of the pole. In the position illustrated in Fig. 4 the abutments 20 bear on the counter-abutments 30, so that no further tilting of the pole can take place under the action of the springs 22. The set of wheels is accordingly automatically held by the latter in the tilted-up position. In the firing position, the gunner can from his seat 10 train the upper gun carriage portion 7 about the pivot pin 8, sideways, by operating the usual members (not shown in the drawing) e.g. a hand crank. In this rotary movement the wheels 16 take part, together with their carrier arms 15. If necessary, the wheels can be taken off, as well be described hereinafter.

The safety device illustrated in Fig. 5 prevents the pole 12 from being tilted downward in the firing position according to Fig. 4 when the wheels 16 are taken off. The latter are journalled on axles 34, which fit into the bushes 36 and are secured therein against being pulled out by safety bolts fitting into the bores 43. In each of the hollow arms 15 a rod 37 is guided shiftably at one end while its other end is articulated on a cam 38 which is pivotably mounted in the wall of the arm 15. In the trunnion 13 a recess 39 is provided which is in juxta-position to the cam 38 when the gun carriage is in the firing position. A spring 41 abutting on a projection of the wall of the arm 15 bears on the cam 38 and tends to force the same into the recess 39. This, however, is prevented by the rod 37 as long as the axles of the wheels 16, or at least one of them are pushed into the bushes 36, in that these axles prevent the free ends of the rods 37 from penetrating into the bushes 36. Fig. 5 shows the safety device in the locking position. The axles carrying the wheels, at any time after being taken off, can be pushed again into the bushes 36, whereby they displace the rods 37 in the arms 15, and bring the cams 38 out of engagement with the recesses 39.

When the gun carriage is to be transformed from the firing position according to Fig. 4 into the driving position, the operator seizes the pole 12 and turns the same in the clockwise direction, firstly tensioning the springs 22 until they cross the articulation points of the pole 12 and begin to unload themselves. Shortly after, the wheels 16 come to rest on the soil. The work required then for raising the tripod 35 together with the upper portion 7 of the gun carriage in part supplied by the springs 22, the other part has to be done by the operator. Upon reaching the driving position, the bolts 25 get over the guide faces 42 in front of the eyes 27 and snap into the same by the action of the spring 26 whereby the tripod 35 is secured against being lowered unintentionally.

The invention is not limited to the embodiment described by way of example. It could for example be applied to a gun carriage, whose set of wheels is, in addition, especially sprung with respect to the upper portion of the gun carriage. Likewise the invention is not limited to being used for guns, but could be used for weapons or military implements of any kind.

What I claim as my invention and desire to secure by Letters Patent is:

1. A carriage for guns and the like comprising in combination a carriage body, a set of wheels connected to said carriage body movable to a lower driving position and a raised position, said wheels when in said lower position supporting the weight of said carriage body, and when in raised position said wheels are relieved from said weight, a manually operated pole oscillatably pivoted on said carriage body for movement from a lower end position through an intermediate position to an elevated end position, linking means operatively connecting said set of wheels with said pole, said lower driving position of said carriage body corresponding to said lower end position of said pole and said raised position corresponding to said elevated end position, a resiliently loadable balancing means, fastening means connecting said balancing means to a point of said carriage body as well as to a point of said pole, the distance of said points increasing to a maximum value upon movement of said pole from said lower end position to said intermediate position and decreasing from said maximum value upon movement of said pole from said intermediate position towards said elevated end position thereby to effect loading of said balancing means upon movement of said pole from said lower end position to said intermediate position and unloading of said balancing means upon movement of said pole from said intermediate position to said elevated end position.

2. A carriage for guns and the like comprising in combination a carriage body, a wheel carrier tiltably connected to said carriage body, a set of wheels journalled on said wheel carrier, said wheel carrier having a lower driving position in which said wheels support the weight of said carriage body, and a raised position in which said wheels are relieved of said weight, a pole oscillatably pivoted on said carriage body for movement from a lower end position through an intermediate position to an elevated end position, linking means operatively connecting said wheel carrier with said pole, said lower driving position of said wheel carrier corresponding to said lower end position of said pole, and said raised position corresponding to said elevated end position, a coiled spring having two ends, one of said ends being fastened to said carriage body and the other end being fastened to a point fixed with respect to said pole, the distance of said points increasing to a maximum value upon pivoting said pole from said lower end position to said intermediate position and decreasing from said maximum value upon pivoting said pole from said intermediate position towards said elevated end position, to convey said wheel carrier from said lower driving position to said raised position by pivoting said pole from said lower end position to said elevated end position.

References Cited in the file of this patent

UNITED STATES PATENTS

| 2,016,717 | Herlach | Oct. 8, 1935 |
| 2,199,392 | Dabrasky | May 7, 1940 |
| 2,344,252 | Kiang | Mar. 14, 1944 |
| 2,348,445 | Bayer | May 9, 1944 |
| 2,382,836 | Walter | Aug. 14, 1945 |
| 2,720,818 | Swipp et al. | Oct. 18, 1955 |

FOREIGN PATENTS

| 914,867 | France | July 1, 1946 |